(12) United States Patent
Tsuchiya et al.

(10) Patent No.: US 6,471,150 B1
(45) Date of Patent: Oct. 29, 2002

(54) THREADING MECHANISM FOR MAGNETIC RECORDING/REPRODUCING APPARATUS (75) Inventors: Manabu Tsuchiya; Kouji Fujita, both of Yamagata (JP)

(73) Assignee: NEC Corporation, Tokyo (JP)

( * ) Notice: Subject to any disclaimer, the term of this patent is extended or adjusted under 35 U.S.C. 154(b) by 31 days.

(21) Appl. No.: 09/704,981

(22) Filed: Nov. 2, 2000

(30) Foreign Application Priority Data

Nov. 5, 1999 (JP) ............................................. 11-315633

(51) Int. Cl.$^7$ .............................................. G11B 15/00
(52) U.S. Cl. .................................................. 242/332.4
(58) Field of Search ........................... 242/332.4, 332.7, 242/332, 338, 579, 587.2

(56) References Cited

U.S. PATENT DOCUMENTS

| | | | |
|---|---|---|---|
| 4,832,284 A | * 5/1989 | Inoue | 242/195 |
| 4,991,037 A | 2/1991 | Shimizu et al. | 360/71 |
| 5,046,168 A | * 9/1991 | Ohsaki | 360/95 |
| 5,155,639 A | * 10/1992 | Platter et al. | 360/95 |
| 5,542,260 A | * 8/1996 | Ohshita | 242/332.4 |
| 5,927,633 A | 7/1999 | McAllister | 242/348.2 |
| 5,979,813 A | 11/1999 | Mansbridge et al. | 242/332.4 |
| 6,034,839 A | * 3/2000 | Hamming | 360/95 |

FOREIGN PATENT DOCUMENTS

| | | | | |
|---|---|---|---|---|
| EP | 0 143 598 A2 | 6/1985 | ........... | G11B/15/67 |
| EP | 0 932 155 A2 | 7/1999 | ........... | G11B/23/26 |
| EP | 1 054 396 A2 | 11/2000 | ........... | G11B/15/67 |
| JP | 6-267160 | 9/1994 | ........... | G11B/15/67 |
| JP | 8-195003 | 7/1996 | ........... | G11B/15/67 |
| WO | WO 83/04453 | 12/1983 | ........... | G11B/15/00 |
| WO | WO 98/44499 | 10/1998 | ........... | G11B/15/67 |
| WO | WO 00/30090 | 5/2000 | ........... | G11B/15/67 |
| WO | WO 00/30096 | 5/2000 | ........... | G11B/15/67 |

OTHER PUBLICATIONS

European Patent Office, European Search Report, May 22, 2001, 4 pages.

* cited by examiner

*Primary Examiner*—Donald P. Walsh
*Assistant Examiner*—Mark J Beauchaine
(74) *Attorney, Agent, or Firm*—Michael Best & Friedrich LLC (57) ABSTRACT

In a threading mechanism for taking out a leader pin secured to one end of a magnetic recording tape from a single reel cartridge, moving the leader pin to a predetermined guide path and threading the magnetic recording tape around a reel in a magnetic recording/reproducing apparatus, when a cartridge loader holding the cartridge is moved to the cartridge loading position of a deck base by a loader guide mounted on the deck base, a threader drive for holding the leader pin and guiding the leader pin to the reel through the guide path rotates the leader block in cooperation of a retractor cam provided to the cartridge loader and a retractor provided to the deck base, engages a hook provided to the leader block with the leader pin from the rear side thereof along the loading direction of the cartridge loader to clamp the leader pin to the leader block, and guides the leader pin to the guide path.

2 Claims, 13 Drawing Sheets

THREADING MECHANISM FOR MAGNETIC RECORDING/REPRODUCING APPARATUS

BACKGROUND OF THE INVENTION

1. Field of the Invention

The present invention relates to a threading mechanism for a magnetic recording/reproducing apparatus for taking out a leader pin secured to one end of a magnetic recording tape from a single reel cartridge, moving the lading pin to a predetermined guide path and threading the magnetic recording tape around a reel in the apparatus.

2. Description of the Related Art

In this type of threading mechanism, when a cartridge loader for holding a cartridge is moved to the cartridge loading position of a deck base by a loader guide mounted on the deck base, a leader pin is held and guided to a reel through a guide path by a threader drive.

Figure 1:
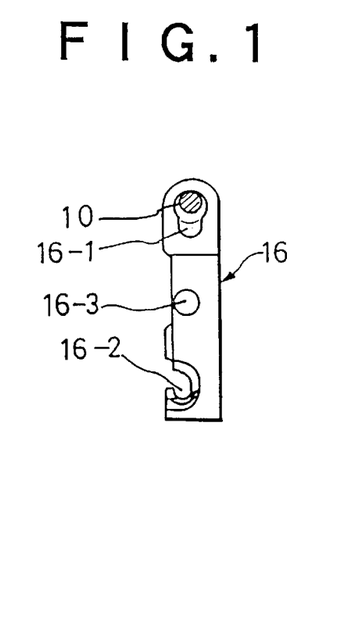
FIG. 1 is a plan view showing a leader block to explain a conventional threading mechanism.
Figure 2:
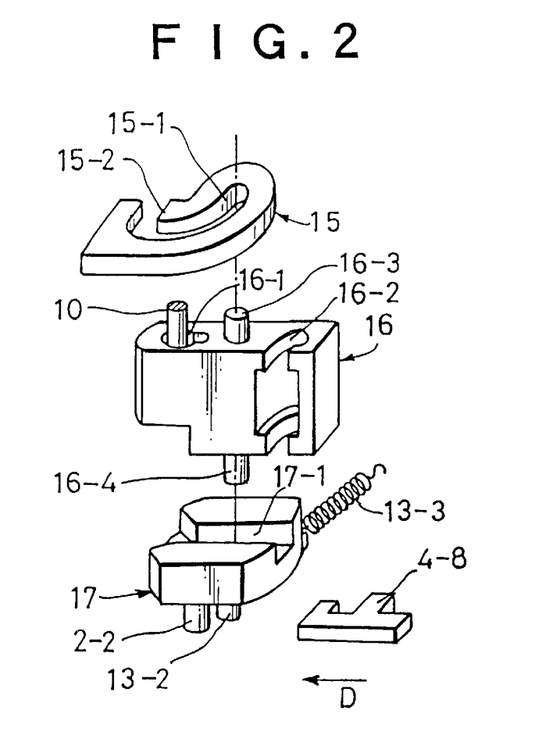
FIG. 2 is a exploded perspective view showing a leader block to explain a conventional threading mechanism.

In this case, the threading drive is designed so that leader block 16 having a hook 16-2 which is hooked to the leader pin to hold the leader pin (not shown) is guided to the guide path (not shown) by the threading pin 10 as shown in FIGS. 1 and 2. At the cartridge loading position, the hook 16-2 is hooked to the leader pin through the operation of guides (guide grooves 15-1, 15-2) of guide cam 15 and retractor block 17 which are respectively secured to the deck base (not shown).

That is, the leader block 16 has pins 16-3 and 16-4 at the upper and lower portions thereof, and they are located in the guide grooves 15-1, 15-2 and the groove 17-1 of the retractor block 17 respectively. When retractor cam 4-8 provided to the cartridge loader (not shown) abuts against the retractor pin 13-2 of the retractor block 17 when the cartridge is loaded, the retractor block 17 is rotated around the pin 2-2 serving as the support shaft thereof the against the tensile force of a retractor spring 13-3 and also the threading pin 10 is moved to the guide path side, whereby the pins 16-3, 16-4 are slid in the guide groove 15-2 and the groove 17-1. During this sliding motion of these pins, the leader block 16 is rotated while guided along the groove 15-2 and hooked to the leader pin. The pins 16-3, 16-4 are released from the guide grooves 15-1 and 17-1 by the time when the loading operation is completed, and the leader block 16 is moved to the guide path while guided by the threading pin 10.

In such a conventional threading mechanism, the leader block 16 is rotated by the rotation of the retractor block 17 and the pulling operation of the threading pin 10 to the guide path side, whereby the leader pin is hooked by the hook and clamped by the leader block 16. Therefore, a stable operation could not be achieved unless the synchronizing adjustment between the retractor block 17 and the threading pin 10 is not accurately carried out.

SUMMARY OF THE INVENTION

The present invention has an object to provide a threading mechanism for a magnetic recording/reproducing apparatus in which an operation of clamping a leader pin by a leader block is carried out by a simple rotational motion of the retractor block, thereby achieving a stable operation.

In order to attain the above object, according to the present invention, a threading mechanism for taking out a leader pin secured to one end of a magnetic recording tape from a single reel cartridge, moving the leader pin to a predetermined guide path and threading the magnetic recording tape around a reel in a magnetic recording/reproducing apparatus, comprising:

a cartridge loader for holding the cartridge;

a deck base which mounts a loader guide for moving the cartridge loader to a cartridge loading position; and a threader drive for holding the leader pin and guiding the leader pin to the reel through the predetermined guide path when the cartridge loader is moved to the cartridge loading position;

wherein the threader drive provides a leader block having a hook which holds the leader pin, and the leader block is rotated to engage the hook with the leader pin in cooperation of a retractor cam provided to the cartridge loader and a retractor provided to the deck base.

DETAILED DESCRIPTION OF THE PREFERRED EMBODIMENTS

Preferred embodiments according to the present invention will be described hereunder with reference to the accompanying drawings.

First Embodiment

A first embodiment according to the present invention will be described with reference to FIGS. 3A, 3B to 20.

Figure 3A:
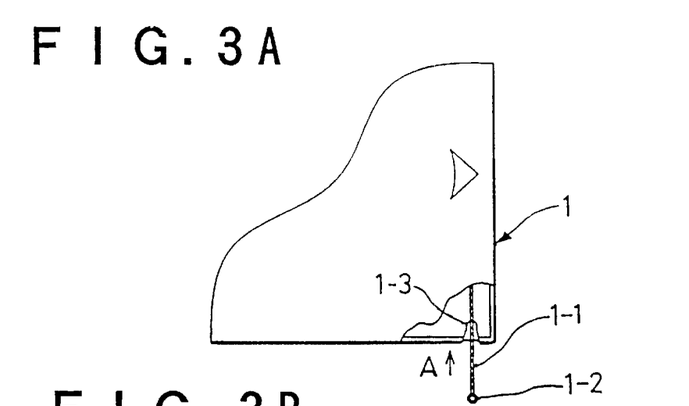
FIGS. 3A and 3B are plan and front views showing a cartridge 1 for a magnetic recording medium which is targeted to be threaded by a threading mechanism.
Figure 3B:
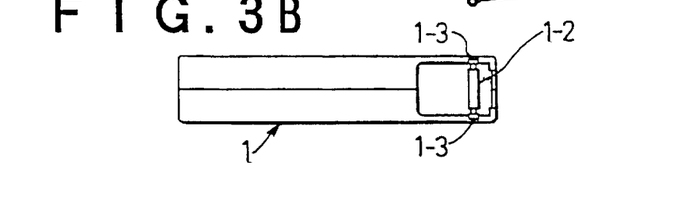

As shown in FIGS. 3A and 3B, a magnetic recording/reproducing apparatus of this embodiment is applied to recording medium having magnetic tape 1-1 in single reel cartridge 1. The magnetic tape 1-1 is equipped with leader pin 1-2 at the leading end thereof, and the upper and lower ends of the leader pin 1-2 are fitted into pin fixing grooves 1-3 formed at the upper and lower edges inside of a tape inlet/outlet port of the cartridge 1 so as to be supported in the direction indicated by an arrow A in FIGS. 3A and 3B.

Figure 4:
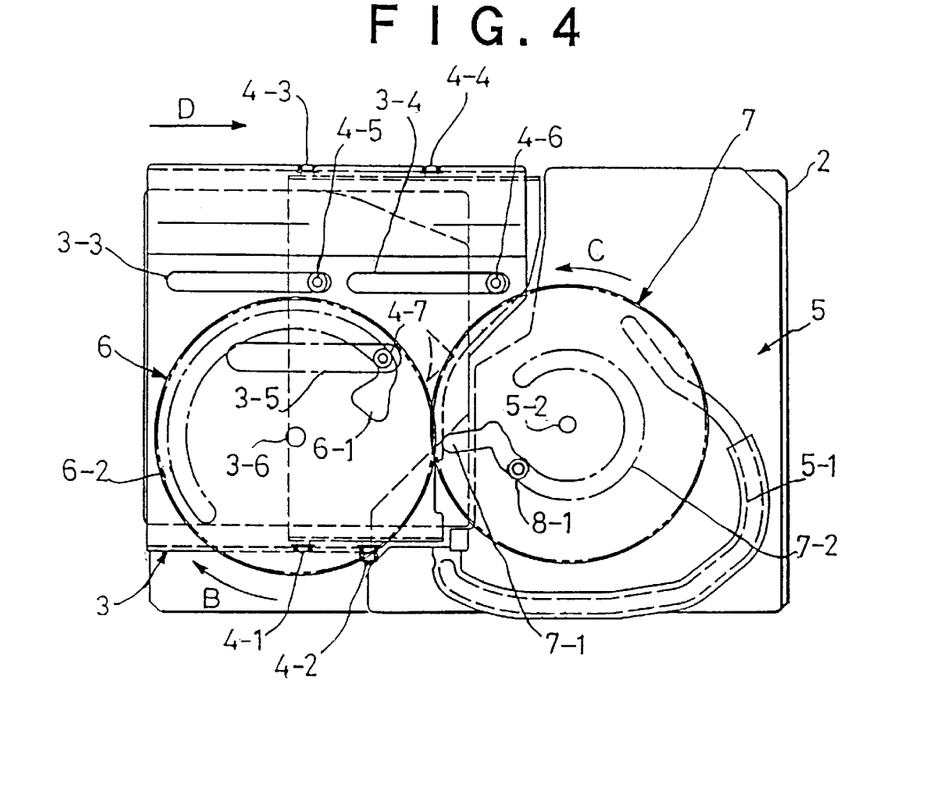
FIG. 4 is a plan view showing the overall construction showing an embodiment according to the present invention.

Loader guide 3 which is molded from a panel is mounted on the upper surface of deck base 2, and bearing guide slits (or rails) 3-1 to 3-5 are provided on both the side surfaces and upper surface of the loader guide 3. Further, pin 3-6 is provided on the upper surface of the loader guide 3.

Figure 5:
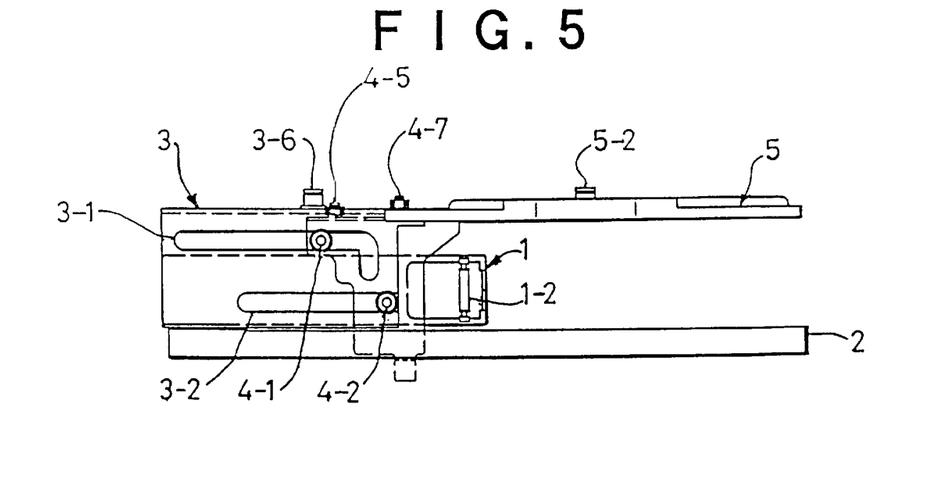
FIG. 5 is a front view showing the main part of the embodiment.
Figure 6:
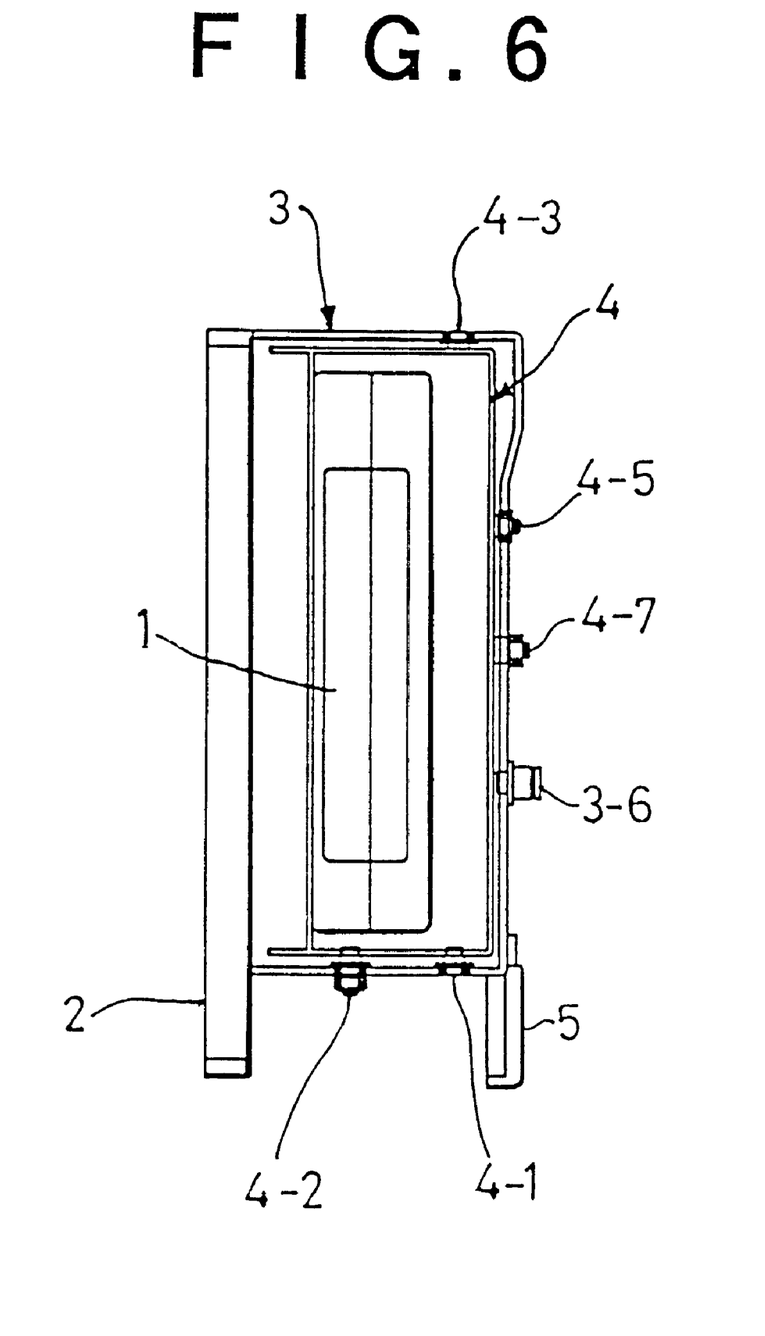
FIG. 6 is an end face view showing the main part of the embodiment.

Cartridge loader 4 which is guided in the loading direction on the deck base 2 along the loader guide 3 is equipped with bearings 4-1 to 4-4 at both the side surfaces thereof and bearings 4-5, 4-6 at the upper surface thereof, and these bearings are movable along bearing guide slits (or rails) 3-1 to 3-4 (the guide slits corresponding to the bearings 4-3, 4-4 are not shown). Further, the cartridge loader 4 is also equipped with loader drive roller 4-7 at the upper surface thereof. The loader drive roller 4-7 is disposed so as to penetrate through slit 3-5 formed in the upper surface of the loader guide 3 and project upwardly therefrom. The cartridge loader 4 is equipped with a retractor cam 4-8 at the lower portion thereof Further, cam plate 5 is secured to the upper surface of the deck base 2 so as to confront the cartridge loading position. Threader guide groove 5-1 serving as a guide path for guiding a threader drive (described later) is formed on the lower surface of the cam plate 5, and pivot shaft 5-2 is provided on the upper surface of the cam plate 5. Threader drive gear 7 is freely rotatably supported by the pivot shaft 5-2.

Further, loader drive gear 6 which is engaged with the threader drive gear 7 is freely rotatably supported on pivot shaft 3-6 provided on the upper surface of the loader guide plate 3, and a loader drive cam groove comprising radial portion 6-1 and peripheral portion 6-2 is provided on the back surface of the loader guide plate 3, and the loader drive roller 4-7 is fitted in the loader drive cam groove so as to be guided along the loader drive cam groove. When the loader drive gear 6 is rotationally driven, the loader drive roller 4-7 is moved with the loader drive cam groove serving as a guide, the cartridge loader 4 in which the cartridge 1 is inserted is moved in the direction indicated by an arrow D of FIG. 7, whereby the cartridge 1 reaches the loading position (the state shown in FIG. 10).

The threader drive gear 7 is equipped with a threader drive cam groove comprising radial portion 7-1 and peripheral portion 7-2 on the back surface thereof, and threader drive roller 8-1 is fitted in the threader drive cam groove so as to be guided along the threader drive cam groove. The threader drive roller 8-1 is provided on the upper surface of a threader drive arm 8 which is freely rotatably supported through pivot shaft 2-1 to the deck base 2 side (in this embodiment, the upper surface of the cam plate 5), and it swings the threader drive arm 8 around the pivot shaft 2-1 through the threader drive cam groove by the rotational motion of the threader drive gear 7.

Figure 19:
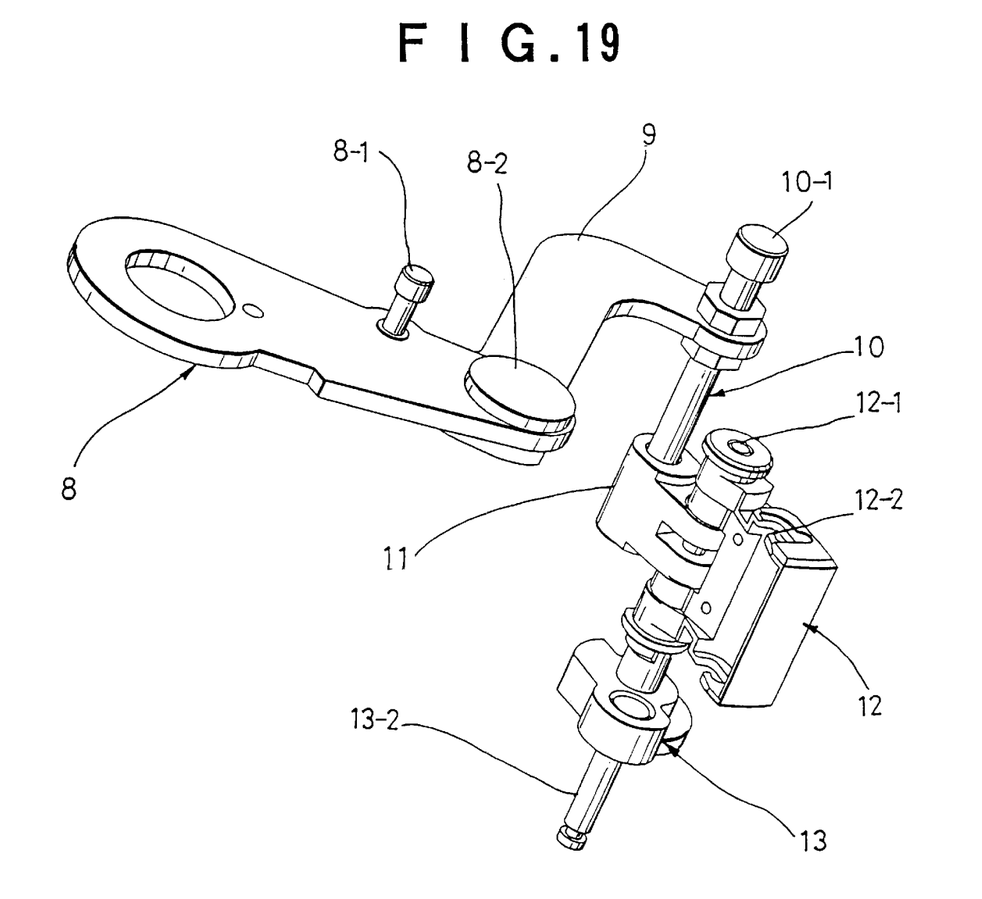
FIG. 19 is an upper-side perspective view showing the overall construction of the threading mechanism.
Figure 20:
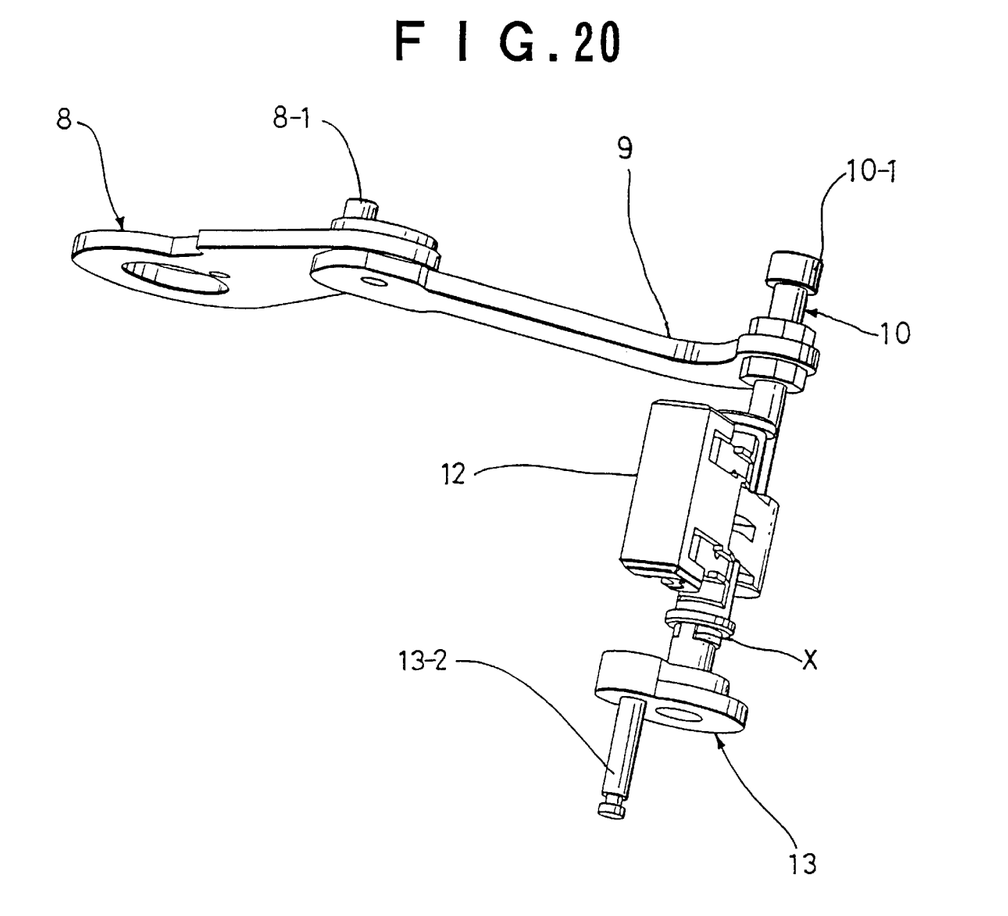
FIG. 20 is a lower-side perspective view showing the overall construction of the threading mechanism.

A threading arm 9 is freely movably mounted to the tip of the threader drive arm 8 through pin 8-2, and threading pin 10 is supported at the tip of the threading arm 9. Threading roller 10-1 is secured to the upper end of the threading pin 10 (the detailed construction is shown in FIGS. 19 and 20). The threading roller 10-1 is fitted in the threader guide groove 5-1 so as to be guided along the threader guide groove 5-1, and makes a slide motion along the threader guide groove 5-1 interlockingly with the motion of the threading arm 9.

The threading mechanism supports a threading block 11 at the lower portion of the threading pin 10 so that the threading block 11 is freely rotatable. Leader block 12 is freely rotatably supported at the side portion of the threading block 11 through a pin 12-1 (eccentric from the threading pin 10) (see FIGS. 19 and 20). The leader block 12 is provided at the tip thereof with hook 12-2 which is hooked the leader pin 1-2 to clamp (grasp) the leader pin 1-2, and fitting groove 12-3 is formed at the lower end portion of the hook 12-2 (see FIG. 15).

Figure 9A:
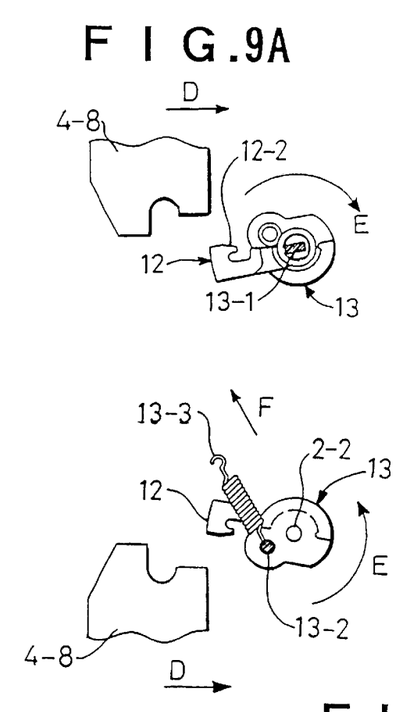
FIGS. 9A to 9C are plan and bottom views showing the main part of a threading mechanism of the present invention in accordance with the operation state thereof.
Figure 9B:
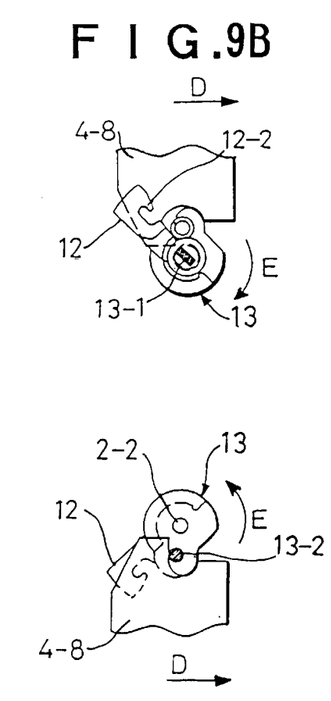
Figure 9C:
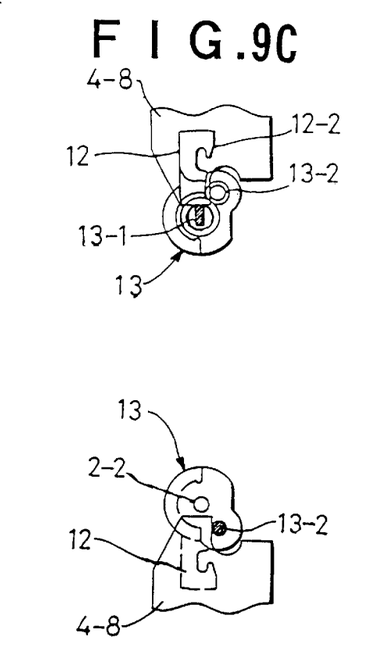

In association with the leader block 12, the retractor provided at the deck base side is equipped at the top portion of the retractor table (block) 13 with a projection 13-1 which is detachably fitted to the fitting groove 12-3 (see X portion of FIG. 20), and the retractor table 13 is freely rotatably supported by pivot shaft 2-2 provided to the deck base 2 (at the fitting position at which the projection 13-1 is fitted in the fitting groove 12-3, the pivot shaft 2-2 is coaxial with the pin 12-1). Further, retractor pin 13-2 is secured to the retractor table 13, and the retractor table 13 is pulled in a direction F (see FIG. 9) by a retractor spring 13-3 fitted to the retractor pin 13-2.

Next, the threading mechanism thus constructed will be described in connection with the state thereof when the cartridge is loaded.

Figure 7:
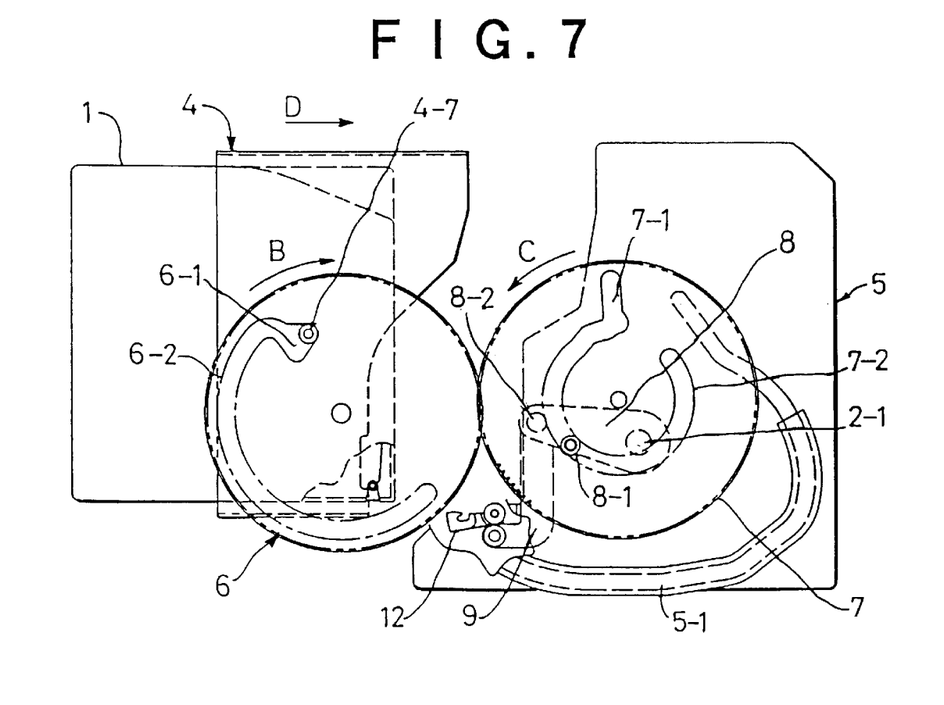
FIG. 7 is a plan view showing the overall construction of the state of the embodiment before a cartridge is loaded.
Figure 8:
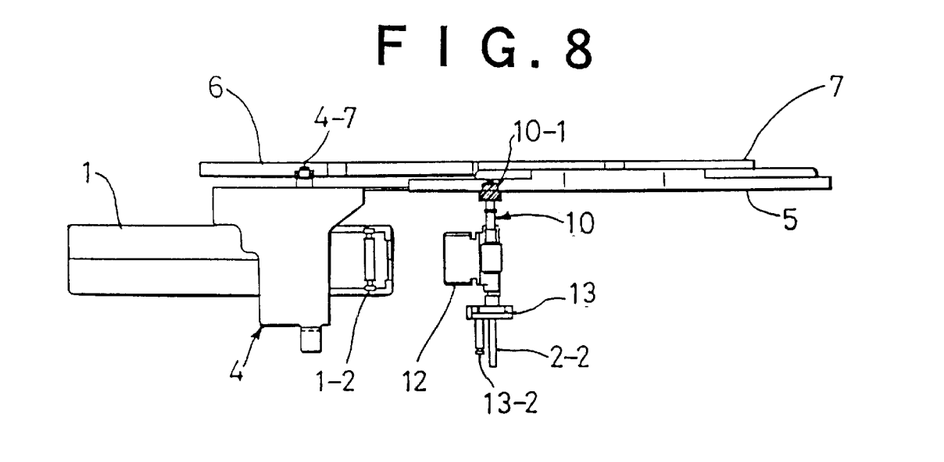
FIG. 8 is a front view showing the main part of the embodiment.

The state of the threading mechanism before the cartridge 1 is inserted into the cartridge loader 4 and fed to the cartridge loading position of the deck base 2, that is, the state of the threading mechanism before the loading operation is set as shown in FIG. 7. In this case, the loader drive roller 4-7 is located at the radial portion 6-1 of the loader drive cam groove, and the threading drive roller 8-1 is located at the peripheral portion 7-2 of the threader drive cam groove.

The leader block 12 is engaged with the retractor table 13 such that the projection 13-1 is fitted in the fitting groove 12-3, and pulled in the direction F by the retractor spring 13-3 (see FIG. 9). First, when the cartridge 1 is inserted into the cartridge loader 4, needed driving force (a driving source is not shown) is applied to the loader drive gear 6 to rotate the loader drive gear 6 in the direction indicated by an arrow B, whereby the loader drive roller 4-7 starts its sliding motion at the position of the radial portion 6-1 of the loader drive groove. With this motion, the bearings 4-1 to 4-6 are slid along the bearing slits (or rails) 3-1 to 3-4 of the loader guide 3, and the cartridge loader 4 makes a straight motion in the direction indicated by an arrow D to load the cartridge 1 to the loading position (see FIG. 10).

Figure 10:
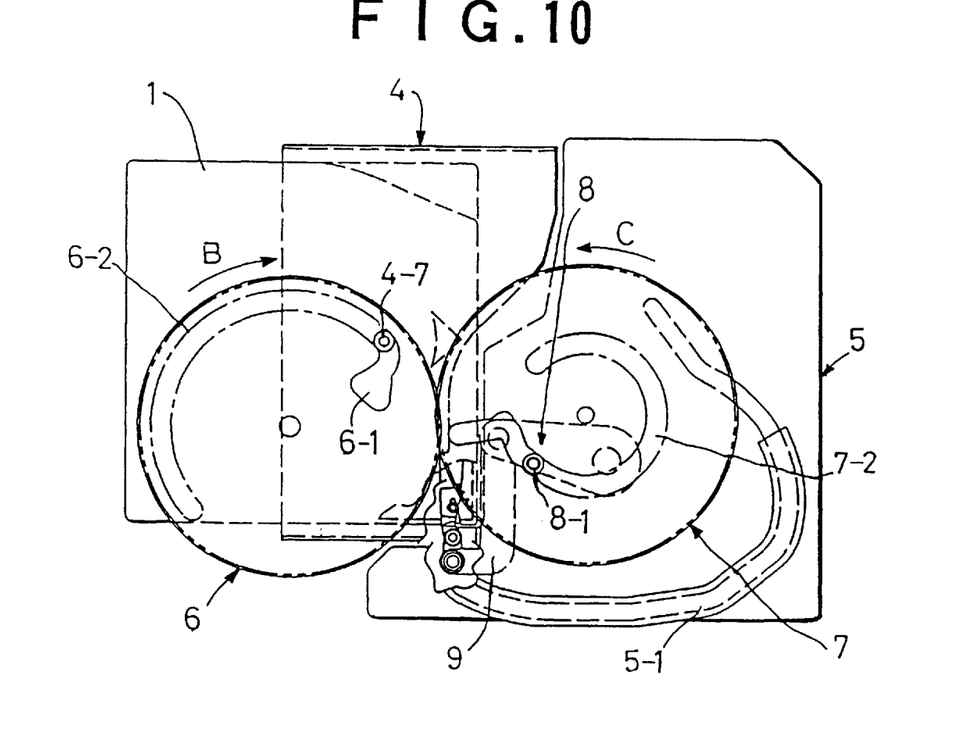
FIG. 10 is a plan view of the overall construction showing the state of the loading position of the cartridge.
Figure 11:
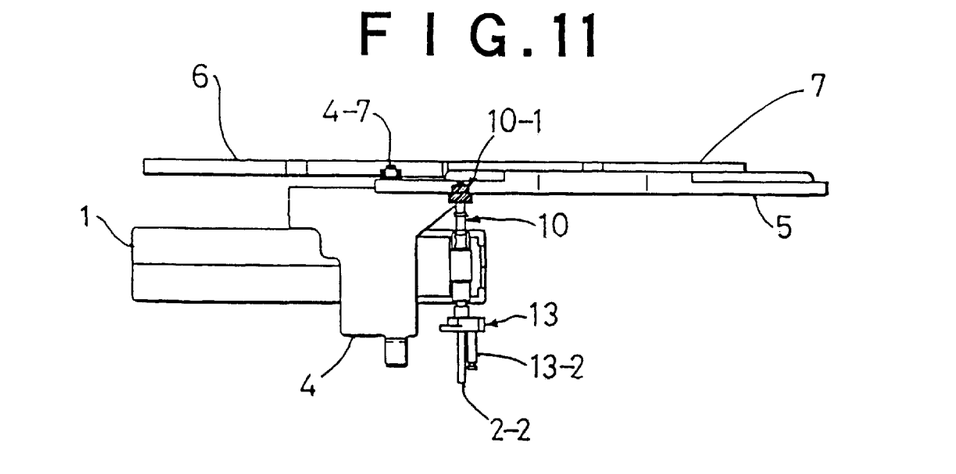
FIG. 11 is a front view of the main part in FIG. 10.
Figure 12:
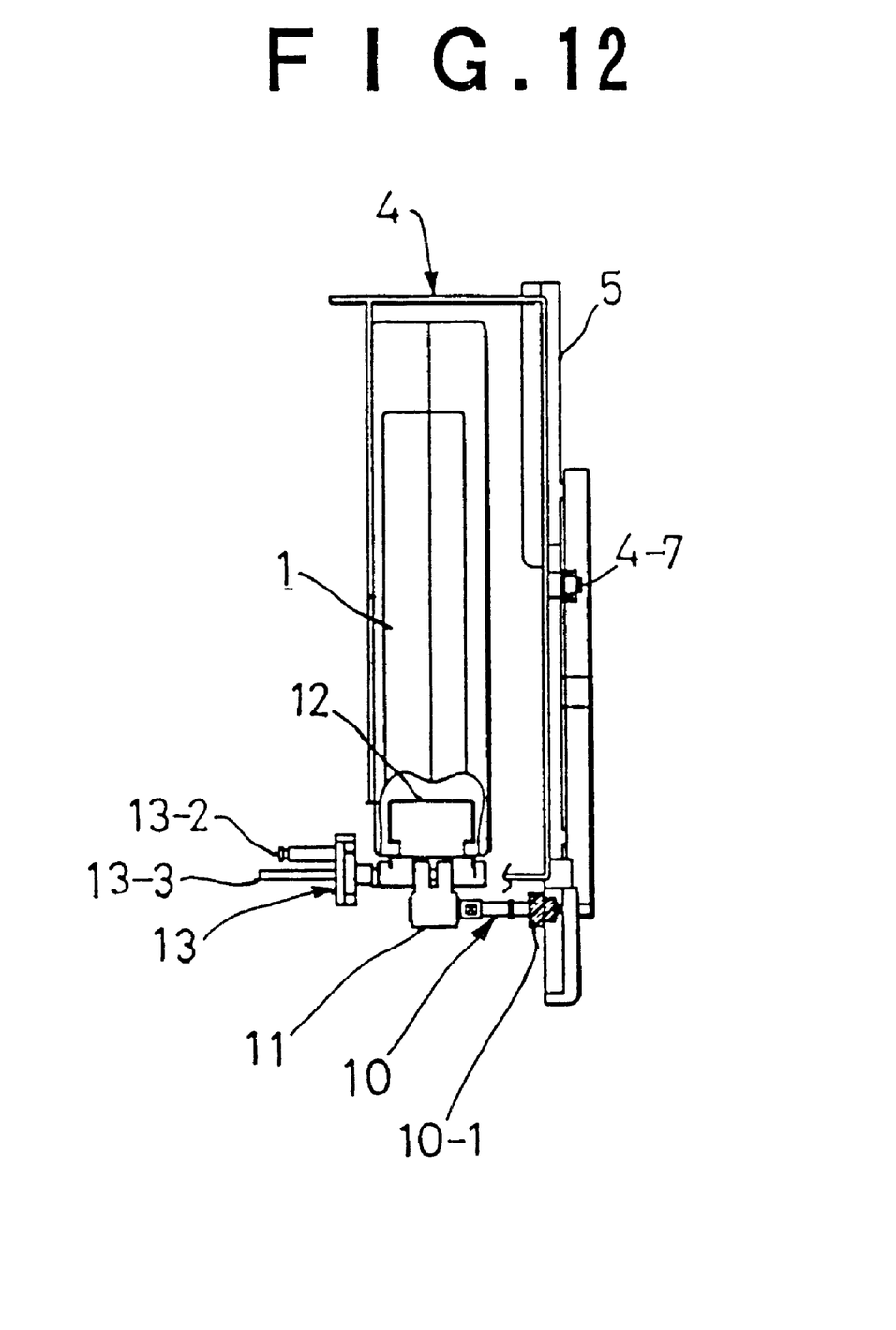
FIG. 12 is an end face view showing the main part in FIG. 10.
Figure 13:
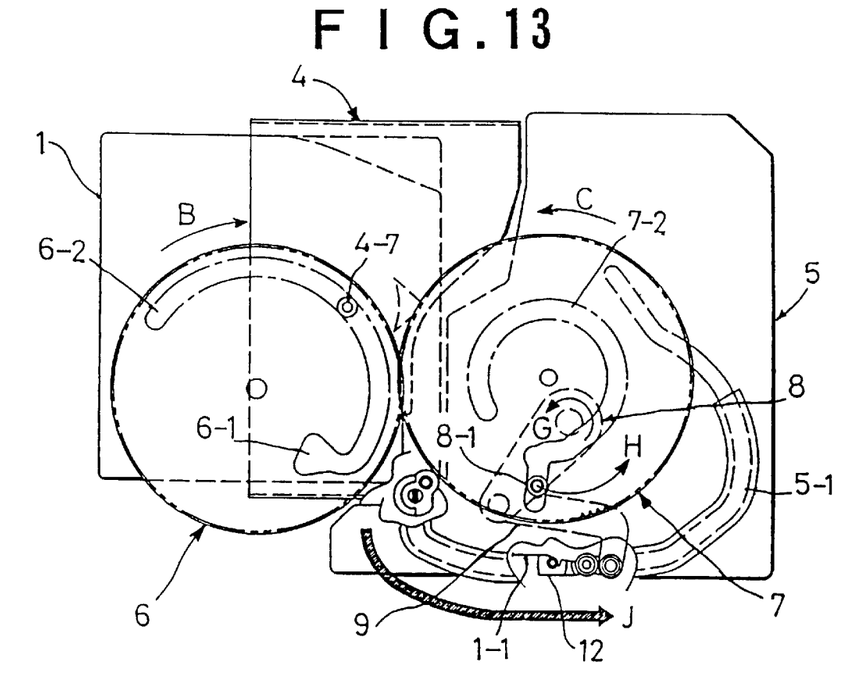
FIG. 13 is a plan view showing the overall construction showing an embodiment of the threading mechanism.
Figure 14:
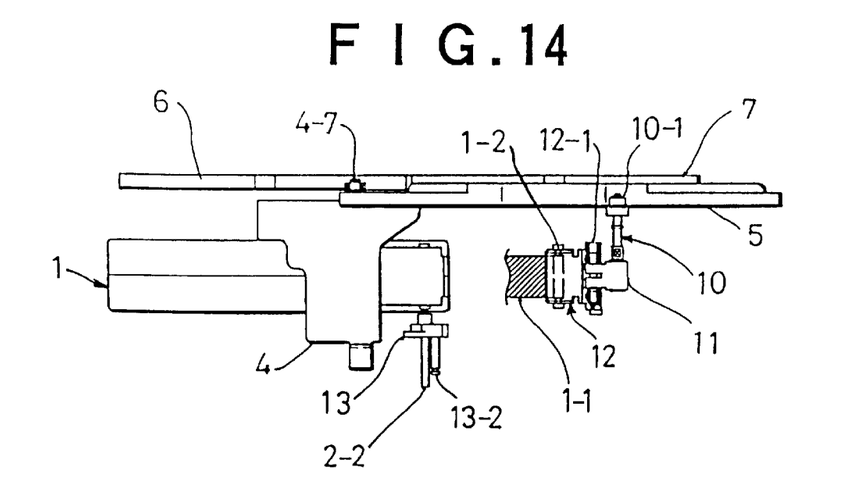
FIG. 14 is a front view showing the main part of FIG. 13.
Figure 15:
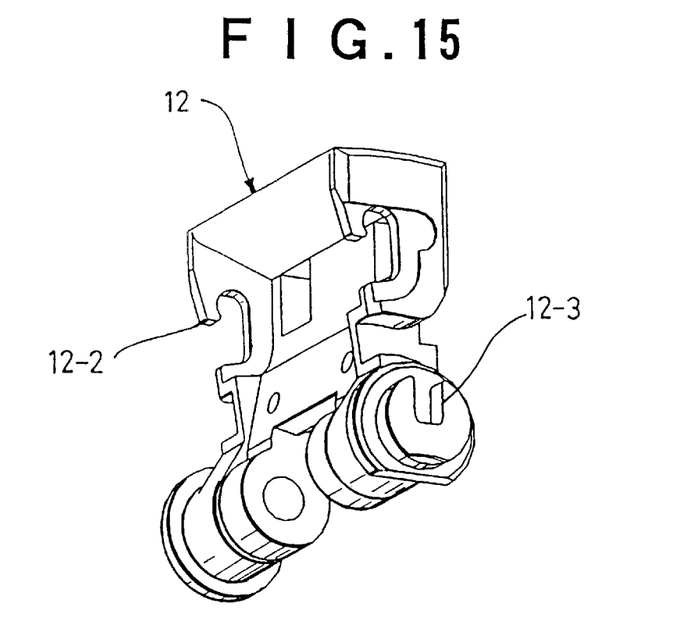
FIG. 15 is a side-inclined perspective view showing a leader block according to the present invention.
Figure 16:
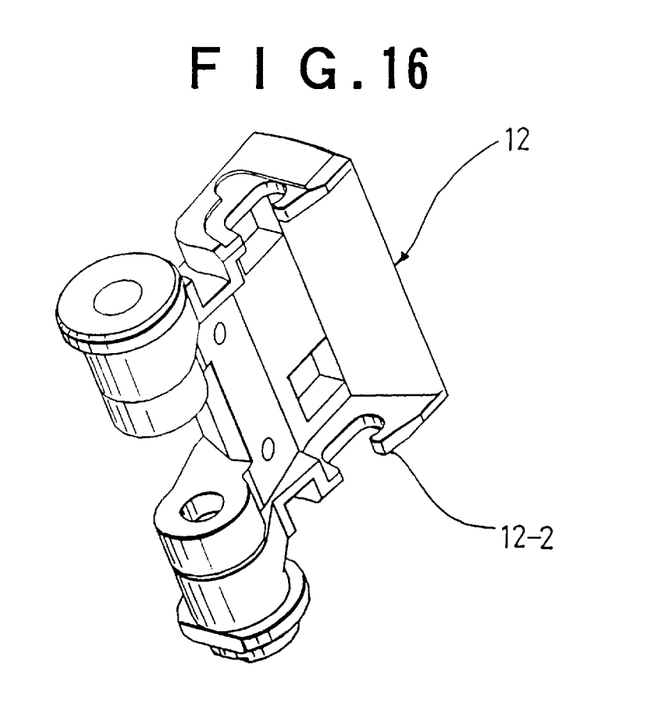
FIG. 16 is a plan perspective view of the leader block.
Figure 17:
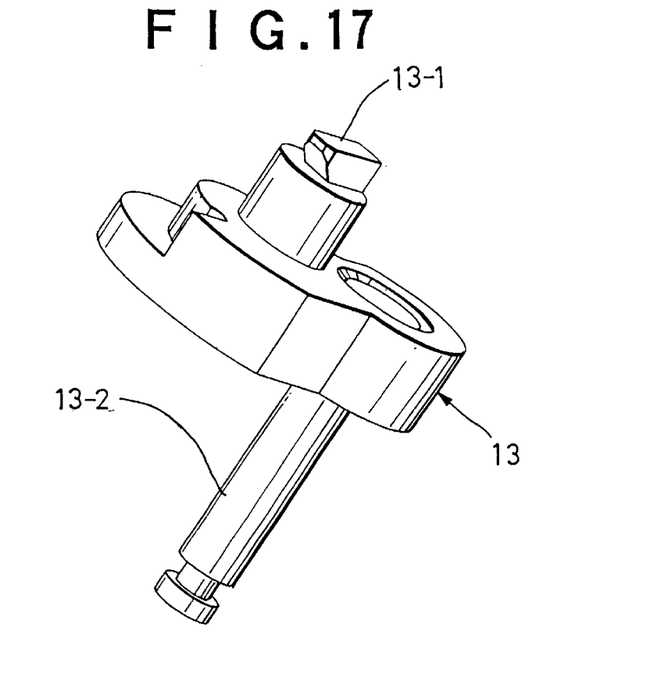
FIG. 17 is a right-side perspective view showing a retractor according to the present invention.
Figure 18:
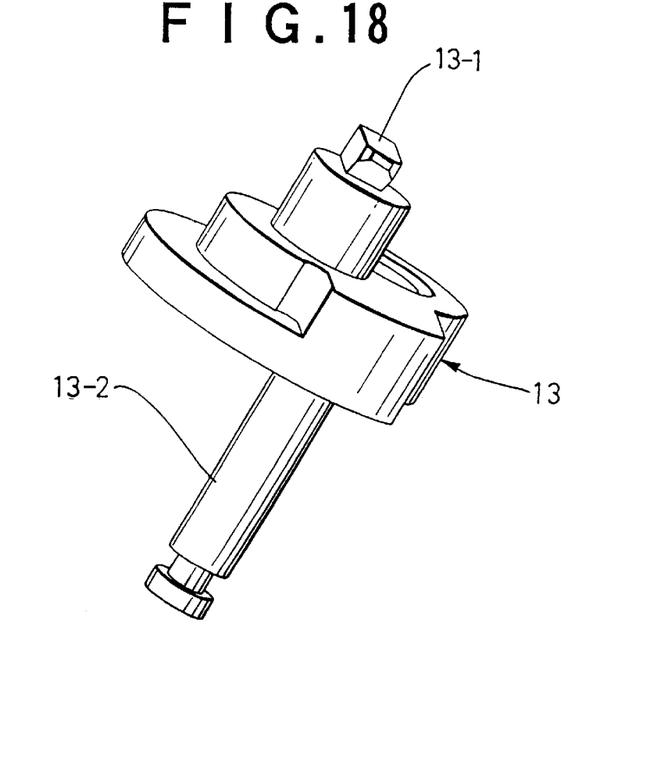
FIG. 18 is a left-side perspective view showing the retractor.

Further, the threader drive gear 7 is rotated in the direction indicated by an arrow C by the rotation of the loader drive gear 6 (see FIG. 10). At this time, the threader drive roller 8-1 is located at the peripheral portion 7-2 of the threader drive cam groove, and thus the location thereof is not varied by the rotation of the threader drive gear 7. Accordingly, the threader drive arm 8 is kept stationary and the threading operation does not occur in the states of FIGS. 7 and 10.

However, the cartridge loader 4 further makes a slide motion in the direction indicated by the arrow D by the further rotation of the loader drive gear 6 in the direction indicated by the arrow B, and at this time the retractor pin 13-2 is pushed in the direction indicated by the arrow D by the retractor cam 4-8 extending downwardly at the lower portion of the cartridge loader 4. Therefore, the retractor table 13 is rotated around the pivot shaft 2-2 in the direction indicated by an arrow E (see FIGS. 9A to 9C).

In this case, since the projection 13-1 is fitted in the groove 12-3 (see the X portion of FIG. 20), the leader block 12 is also rotated by the rotation of the retractor table 13. At this time, the leader block 12 is guided to the tape inlet/outlet port of the cartridge 1, and the hook 12-2 is hooked to the leader pin 1-2 from the rear side of the loading direction, whereby the leader pin 1-2 is clamped (grasped).

At this time point, the loader drive roller 4-7 completes its lane change from the radial portion 6-1 of the loader drive cam groove to the peripheral portion 6-2 thereof. Therefore, the loader drive roller 4-7 makes no further motion even when the loader drive gear 6 further rotates and thus is kept stationary at the current position. On the other hand, the threader drive roller 8-1 completes its lane change from the peripheral portion 7-2 of the threader drive cam groove to the radial portion 7-1 thereof, and it is moved by the rotation of the threader drive gear 7 so as to interchange with the loader drive roller 4-7, whereby the threader drive arm 8 is rotated from the state of FIG. 10.

That is, the threader drive roller 8-1 which has completed its lane change to the radial portion 7-1 of the threader drive cam groove suffers driving force from the threader drive gear 7 by the rotation of the threader drive gear 7 in the direction indicated by the arrow C, and by further rotating the threader drive arm 8, the threading arm 9 operates so as to guide the threading roller 10-1 in the threader guide groove 5-1. By further rotating the threader drive gear 7 in the direction indicated by the arrow C, the threader drive roller 8-1 is moved while drawing a locus H, and the threader drive arm 8 is rotated around the pivot shaft 2-1. Through these operations, the leader block 12 is pulled in the direction indicated by an arrow j through the threading pin 10 and the threading block 11 (see FIG. 13), and the magnetic tape 1-1 is drawn out and guided to a reel (not shown) at the apparatus side while the leader pin 1-2 is clamped by the hook 12-2.

The leader pin 1-2 is subjected to the threading operation as described above. The direction of the force acting on the leader block 12 at this time is parallel to the fitting direction between the groove 12-3 and the projection 131, so that the leader block 12 is released from the restraint of the retractor table 13 and thus it is allowed to move in the direction indicated by the arrow j as described above.

When the magnetic tape 1-1 is stocked into the cartridge 1, this operation can be performed by inversely rotating the loader drive gear 6, that is, by inversely tracing a series of operations as described above. In this case, a reel motor (not shown) for rewinding the magnetic tape 1-1 itself may be provided to the deck base 2 so as to face the lower portion of the cartridge 1.

Second Embodiment

Figure 21:
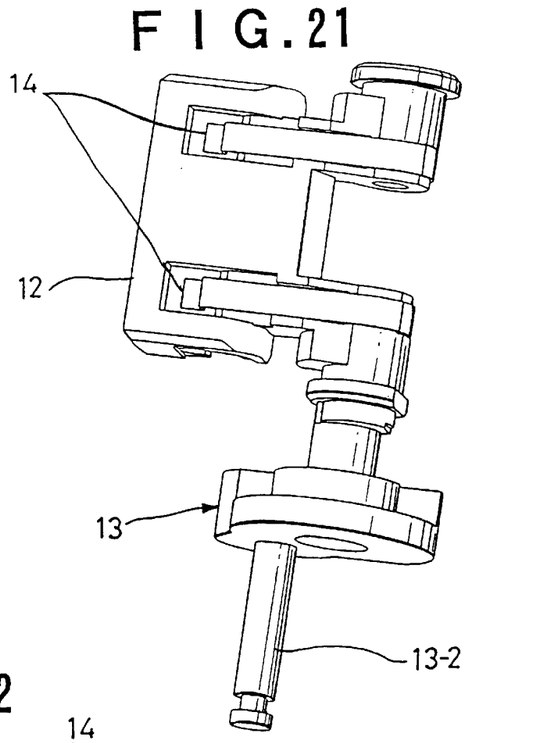
FIG. 21 is a perspective view showing the main part of another embodiment of the present invention.
Figure 22:
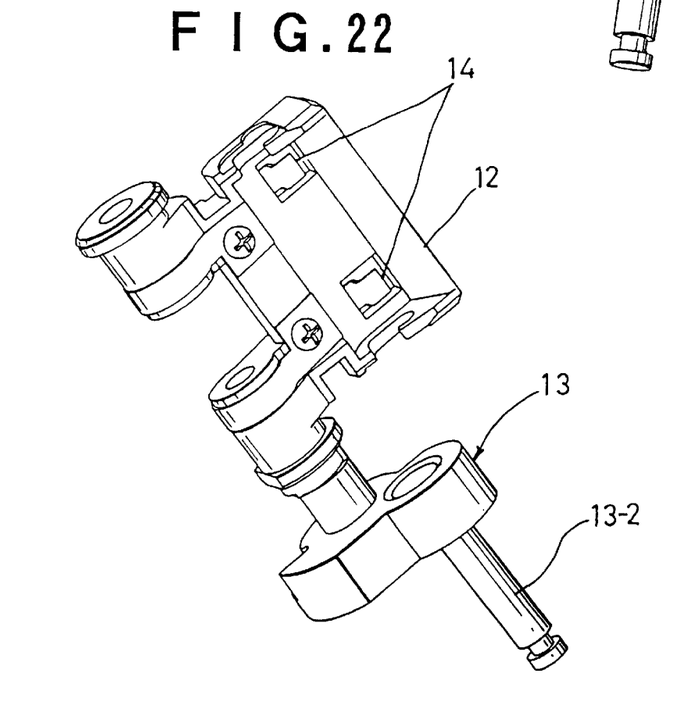
FIG. 22 is an opposite-side perspective view showing the main part of the other embodiment.

In the second embodiment according to the present invention, plate springs 14 are added to the leader block 12 in the threading mechanism to enhance the certainty of the clamp (grasp) of the leader pin 1-2. That is, as shown in FIGS. 21 and 22, the plate springs 14 (that is, elastically holding means) are secured so as to surround the leader block 12. In this embodiment, the plate springs 14 press the leader pin 1-2 at the fitting position of the leader pin 1-2 to enhance the holding power of the leader block 12 to the leader pin 1-2. Accordingly, the leader pin 1-2 can be prevented from falling off the leader block 12 due to an unintentional operation.

As described above, according to the present invention, when the cartridge loader holding the cartridge is moved to the cartridge loading position of the deck base by the loader guide mounted on the deck base, the threader drive which holds the leader pin and guides it to the reel through the guide path rotates the leader block thereof in cooperation of the retractor cam provided to the cartridge loader and the retractor provided to the deck base to fit the hook of the leader block to the leader pin from the rear side thereof along the loading direction of the cartridge loader, thereby clamping the leader pin with the leader block, and then guides the leader pin to the guide path.

Accordingly, unlike the prior art, it is unnecessary to perform the synchronizing adjustment between the retractor block and the threading pin accurately, and also the operation of clamping the leader pin with the retractor block is implemented by a simple rotation of the retractor block with a simple construction, so that a stable operation can be achieved.

What is claimed is:

1. A threading mechanism for taking out a leader pin secured to one end of a magnetic recording tape from a single reel cartridge, moving said leader pin to a predetermined guide path and threading said magnetic recording tape around a reel in a magnetic recording/reproducing apparatus, said mechanism comprising:

a cartridge loader for holding said cartridge;

a deck base which mounts a loader guide for moving said cartridge loader to a cartridge loading position; and a threader drive for holding said leader pin and guiding said leader pin to said reel through said predetermined guide path when said cartridge loader is moved to said cartridge loading position;

wherein said threader drive provides a leader block having a hook which holds said leader pin, and said leader block is rotated to engage said hook with said leader pin in cooperation with a retractor cam provided for said cartridge loader and a retractor provided for said deck base; and wherein during the movement of said cartridge loader to the cartridge loading position, said retractor cam rotates said retractor around a retractor pin, and rotates said leader block to engage said hook with said leader pin, and also said retractor is detachably mounted to said leader block so that said leader block is released therefrom at the time when said cartridge loader reaches said cartridge loading position.

2. A threading mechanism for taking out a leader pin secured to one end of a magnetic recording tape from a single reel cartridge, moving said leader pin to a predetermined guide path and threading said magnetic recording tape around a reel in a magnetic recording/reproducing apparatus, comprising:

a cartridge loader for holding said cartridge;

a deck base which mounts a loader guide for moving said cartridge loader to a cartridge loading position; and a threader drive for holding said leader pin and guiding said leader pin to said reel through said predetermined guide path when said cartridge loader is moved to said cartridge loading position;

wherein said threader drive provides a leader block having the a hook which holds said leader pin, and said leader block is rotated to engage said hook with said leader pin in cooperation with a retractor cam provided for said cartridge loader and a retractor provided for said deck base; and wherein said leader block is provided with elastically holding means for elastically holding said leader pin when said leader pin is clamped by said leader block.

* * * * *